April 20, 1954  M. S. LEWIS ET AL  2,675,623
DEVICE FOR MEASURING THE THICKNESS OF A WET FILM
Filed Aug. 26, 1949
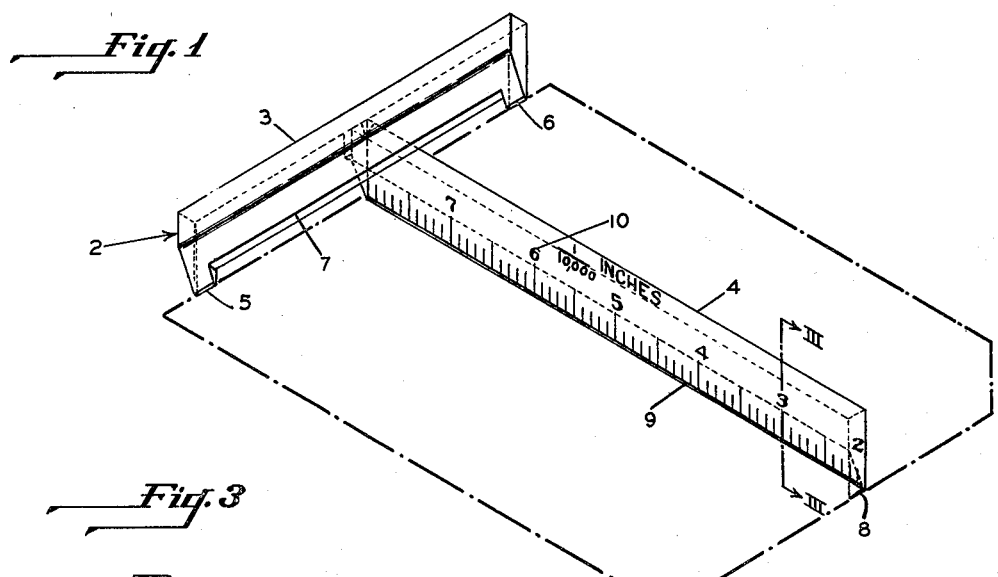
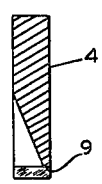
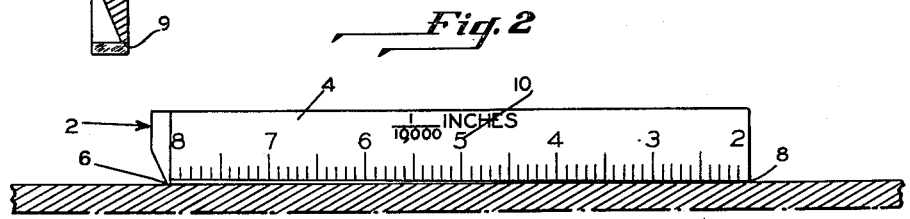
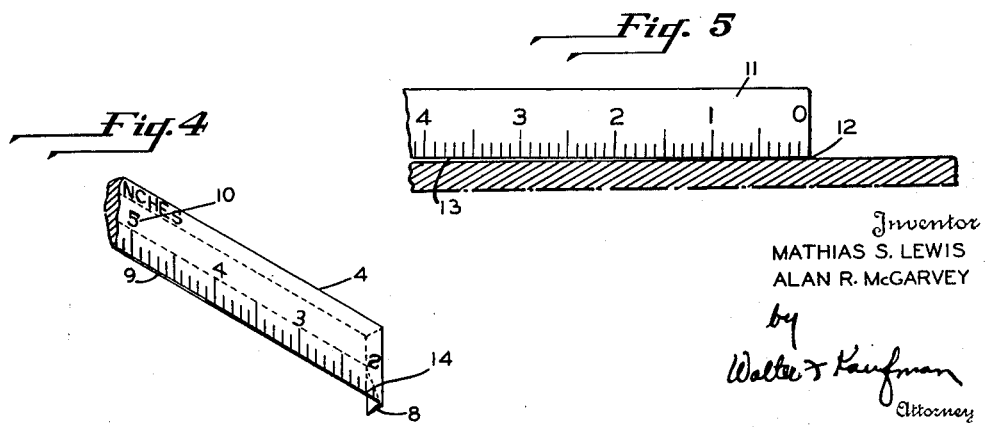
Inventor
MATHIAS S. LEWIS
ALAN R. McGARVEY
by
Walter & Kaufman
Attorney Patented Apr. 20, 1954

2,675,623

UNITED STATES PATENT OFFICE 2,675,623

DEVICE FOR MEASURING THE THICKNESS OF A WET FILM

Mathias S. Lewis, East Hempfield Township, Lancaster County, and Alan R. McGarvey, Lancaster Township, Lancaster County, Pa., assignors to Armstrong Cork Company, Lancaster, Pa., a corporation of Pennsylvania Application August 26, 1949, Serial No. 112,486

6 Claims. (Cl. 33—169)

The present invention relates to a device for measuring the thickness of a wet film and more particularly to a device for measuring the thickness of a film of wet paint, lacquer, or the like applied to a smooth, flat surface.

The only devices commonly used for performing wet film thickness measurement are the Pfund wet film thickness gauge and the Interchemical wet film thickness gauge.

The Pfund gauge consists essentially of a pair of concentric tubes, the inner tube of which is closed at the bottom by a convex piece of glass which projects beyond the terminal end of the inner tube. When the device is placed on the wet film with the outer tube being pressed into engagement with the base to which the film is applied, the outer tube readily penetrates the wet film. The inner tube is then pushed out so as to force the convex piece of glass through the wet film until it touches the base. The gauge is then removed, and the user must carefully measure the diameter of the wet circular spot of film material on the convex piece of glass. This dimension is compared with a table which correlates spot diameter with film thickness. The gauge is dependent for accuracy upon measurement of a small circular spot, and accurate readings cannot be made quickly. Cleaning of the gauge requires some considerable time, and this type of instrument is not practicable for making multiple measurements on quick drying films such as lacquer.

The Interchemical gauge consists of an eccentric center wheel and two concentric outer wheels, one of which bears a calibrated scale. The gauge is rotated through 180° from the highest to the lowest reading on the scale with the gauge being pressed through the paint film. The thickness in thousandths of an inch is read by sighting over the scale at the point where the paint film first makes contact with the inner wheel. This device is difficult to clean, and there is considerable possibility of error caused by the parallax of sighting across the gap between the scale and the film marking on the gauge. In addition, the distance between the graduations on the scale diminishes toward the center, making it very difficult to get accurate readings on the central part of the scale.

It is an object of our invention to provide a gauge in which the determination of film thickness may be readily made along a linear scale with direct reading and extreme accuracy.

A further object of our invention is to provide a gauge which may be readily cleaned for multiple determinations of thickness on quick drying films.

The device of the present invention comprises a graduated scale and means for supporting the scale in an inclined position. The support includes a plurality of surfaces or points which penetrate the wet film to be measured and engage the base to which the film is applied. These supporting surfaces or points define a plane of reference which is common to the plane of the surface of the base to which the film is applied. The lower surface of the scale is flat and provides a surface for contact with the wet film which when coated with the wet film along a portion of its length is wide enough to be readily visible to the eye of the user. The side of the gauge is provided with graduations which extend down to the lower film-contacting surface and denote the distance from the plane of reference to the film-contacting surface.

In order that the invention may be readily understood, a typical embodiment and a modification thereof will be described in connection with the attached drawing in which:

Figure 1 is an isometric view of the device of the invention;

Figure 2 is an elevational view of the device in position on a flat, smooth surface showing sections;

Figure 3 is a sectional view taken along the line III—III of Figure 1 and is enlarged;

Figure 4 is a bottom perspective view of a portion of the device of Figure 1 showing a wet film thereon; and Figure 5 is an elevational view similar to Figure 2 showing a portion of a modified gauge.

The drawings are not to scale, and some of the parts have been greatly exaggerated to better illustrate the invention. Where this may be important, specific mention of typical dimensions will be made.

The preferred embodiment of the invention is illustrated in Figures 1 to 4. The device is made in the form of a T-shaped body which has been generally indicated by the reference numeral 2. It includes a cross arm 3 and a scale arm 4 which constitutes the other arm of the T. The arm 3 has two spaced contacting surfaces or points 5 and 6 which are adapted to readily penetrate the film to be measured and lie in engagement with the base to which the film is applied. The arm 3 may be three inches long and the contact surfaces 5 and 6 about .010 inch wide and ¼ inch long. They are preferably tapered as illustrated in Figure 1. The contacting surfaces may be more pointed, particularly if hardened steel or synthetic sapphire points are used. The central portion of the arm 3 is cut away as indicated at 7. The scale arm 4 of the gauge is preferably welded to the cross arm 3 and disposed at right angles with respect thereto. The outer end of the scale arm 4 is provided with a projecting contacting surface 8 which, like surfaces 5 and 6, is adapted to readily penetrate the film to be measured and lie in engagement with the base. This surface may be .010 inch wide and ¼ inch long, tapering up to the scale arm 4. It, too, may be more pointed. Regardless of their shape, the elements 5, 6, and 8 are hereinafter referred to as contacting surfaces.

The contacting surfaces 5, 6, and 8 define a plane of reference which has been indicated by the chain line in Figure 1. When the gauge is in use, this plane will coincide with the plane of the surface upon which lies the film to be measured.

The lower surface 9 of the scale arm 4 is preferably flat and straight and of a width when coated with the wet film to be measured which will provide a body of wet film readily visible to the user. In devices for measuring lacquer or paint film from .002 inch to .003 inch taken on a scale arm six inches long, a surface .0625 inch wide has been found satisfactory.

The surface 9 of the scale arm 4 is inclined with respect to the plane of reference defined by the contacting surfaces 5, 6, and 8. The amount of inclination may vary depending upon the film thickness to be measured. In the typical example given above, the inclination will be from .002 inch from the plane of reference at the end of the surface 9 adjacent the outer end of the scale arm 4 to .008 inch from the plane of reference at the opposite end of the surface 9 where the scale arm 4 joins the cross arm 3.

The scale arm 4 is graduated, as indicated at 10, the graduations denoting the distance from the plane of reference to the surface 9 along the length of the scale. In the typical embodiment, the scale starts with numeral 2, for the contacting surface 8 lies .002 inch below the surface 9 at the outer end of the scale arm. Numeral 3 denotes a distance of .003 inch from the plane of reference, numeral 4 denotes a distance of .004 inch from the plane of reference, and so on up to a distance of .008 inch at the opposite end of the surface 9 where the scale arm 4 joins the cross arm 3 and where the contacting surfaces 5 and 6 are disposed .008 inch from the surface 9. With a scale arm six inches long, the major graduations may be spaced one inch apart and the minor graduations $\frac{1}{10}$ inch apart.

In Figure 5 there is illustrated a scale arm 11 which may be attached to a cross arm similar to the cross arm 3 of Figures 1 and 2. The scale arm 11, however, is adapted to measure film thickness from 0 inch to .008 inch. In this embodiment the forward lower edge surface 12 of the scale arm 11 constitutes one of the contacting surfaces adapted to lie in engagement with the base upon which lies the film to be measured. The inclination of the wet film-contacting surface 13 of this scale arm will be inclined with respect to the plane of reference from 0 inch to .008 inch; and the scale, if eight inches long, will be graduated in the same manner as the scales of Figures 1 and 2. The length of the scale and its graduations may be varied depending upon the thickness of the films to be measured. Where the film thickness is above a minimum value, the gauge of Figures 1 to 4 is preferred; but where the film thickness may vary from 0, the gauge of Figure 5 may be employed. The upper limit on the scale will depend upon the thickness of the film to be measured. In some instances, films .030 inch or more in thickness may be encountered, as in the floor covering industry, and the gauge may be constructed to determine such thicknesses with extreme accuracy.

The gauge when used in measuring the thickness of a wet film, such as a film of lacquer or paint, applied to a piece of plate glass, is positioned so that the contacting surfaces 5 and 6 are pressed through the wet film and in contact with the surface of the glass. The contacting surface 8 of the gauge is held in an elevated position during this step. After the contacting surfaces 5 and 6 have penetrated the paint film and are in contact with the glass surface, the gauge is pivoted about the contacting surfaces 5 and 6 to bring the contacting surface 8 through the wet film and in contact with the glass. This brings the surface 9 into contact with the wet film, and the film coats the surface 9 along a portion of its length, depending upon the thickness of the film. In Figure 4 the surface 9 is coated with a wet film 14 to a line corresponding to 4.1 on the graduations of the scale arm 4. This indicates a wet film thickness of .0041 inch. It will be evident from the examination of Figure 4 that the user may quickly and accurately determine the film thickness to .0001 inch and may conveniently interpolate to .00005 inch by reading between any two graduations on the scale.

The paint film adhering to the gauge may be readily removed with a dry cloth or with a cloth moistened with a suitable solvent, and the gauge is ready for making a subsequent determination of film thickness. Since readings may be quickly and accurately made and since the gauge may be readily cleaned after each determination, the device is useful in making multiple determinations of thickness on wet films of quick drying materials such as lacquer. There are no moving parts, and thus the gauge may be of sturdy construction and will not be subject to mechanical failure.

While we have illustrated and described certain preferred embodiments of our invention, it will be understood that the same is not limited thereto but may be otherwise embodied and practiced within the scope of the following claims.

We claim:

1. A device for measuring the thickness of a wet film applied to the surface of a supporting base comprising a T-shaped member, one arm of said member carrying adjacent to its outer ends contacting surfaces for engagement with the surface of said supporting base through the wet film thereon, the other arm of said member constituting a scale arm and carrying adjacent to its outer end a similar contacting surface, said contacting surfaces defining a common plane of reference, a wet film-contacting surface on the lower surface of said scale arm inclined with respect to said plane of reference, and graduations on said scale for denoting the distance from said plane of reference to said film-contacting surface along the length thereof.

2. A device for measuring the thickness of a wet film applied to the surface of a supporting base comprising a T-shaped member, one arm of which constitutes a scale arm and the other arm of which constitutes a cross bar which carries the scale arm, contacting surfaces on said bar and scale for engagement with the surface of said supporting base through the wet film thereon, said surfaces defining a plane of reference, a wet film-contacting surface on the bottom of said scale arm inclined with respect to said plane of reference, and graduations on said scale arm for denoting the distance from said plane of reference to said film-contacting surface along the length thereof.

3. A device for measuring the thickness of a wet film applied to the surface of a supporting base, the elements comprising a scale arm, a radial arm extending from said scale arm, contacting surfaces on said scale arm and on said radial arm for engagement with the surface of said supporting base through the wet film, said contacting surfaces defining a plane of reference, said radial arm being so positioned with respect to said scale arm that the scale arm will be disposed normal to the surface to be measured when the contacting surfaces are in engagement with the base, said scale arm having a film-contacting surface which is inclined with respect to said plane of reference, and graduations on said scale arm for denoting the distance from said plane of reference to said film-contacting surface along the length thereof.

4. A device for measuring the thickness of a wet film applied to the surface of the supporting base, the elements comprising a scale arm, a plurality of radial arms extending from said scale arm, contacting surfaces on said scale arm and on said radial arms for engagement with the surface of said supporting base through the wet film, said contacting surfaces defining a plane of reference, said radial arms being so positioned with respect to said scale arm that the scale arm will be disposed normal to the surface to be measured when the contacting surfaces are in engagement with the base, said scale arm having a film-contacting surface which is inclined with respect to said plane of reference, and graduations on said scale arm for denoting the distance from said plane of reference to said film-contacting surface along the length thereof.

5. A device in accordance with claim 3 in which said contacting surfaces for engagement with the surface of the supporting base are all disposed below the wet film-contacting surface of said scale arm.

6. A device in accordance with claim 3 in which one of said contacting surfaces for engagement with the surface of the supporting base constitutes the terminal end of said wet film-contacting surface of said scale arm.

References Cited in the file of this patent

UNITED STATES PATENTS

| Number | Name | Date |
|---|---|---|
| 1,909,652 | Bower | May 16, 1933 |
| 2,139,243 | Mohr | Dec. 6, 1938 |
| 2,167,652 | Hoch | Aug. 1, 1939 |
| 2,243,674 | Hoch | May 27, 1941 |
| 2,375,982 | Eriksson | May 15, 1945 |
| 2,507,592 | Euverard | May 16, 1950 |

OTHER REFERENCES

Pamphlet, Interchemical Direct Reading Wet Film Thickness Gauge, published by Gordner Laboratory, Inc., 4723 Elm Street, Bethesda, Maryland, 5 pages, December 1947.